US011343384B1

(12) United States Patent
Guo

(10) Patent No.: US 11,343,384 B1
(45) Date of Patent: May 24, 2022

(54) SYSTEM AND METHOD FOR PROVIDING CUSTOMIZED MERCHANDISE AT ENTERTAINMENT VENUES

(71) Applicant: Cove & Edgewater, LLC, Gardena, CA (US)

(72) Inventor: Yuehua Allen Guo, Palos Verdes Estates, CA (US)

(73) Assignee: Cove & Edgewater LLC, Gardena, CA (US)

( * ) Notice: Subject to any disclaimer, the term of this patent is extended or adjusted under 35 U.S.C. 154(b) by 0 days.

(21) Appl. No.: 17/381,615

(22) Filed: Jul. 21, 2021

(51) Int. Cl.
*H04N 1/00* (2006.01)
*H04N 1/34* (2006.01)

(52) U.S. Cl.
CPC ..... *H04N 1/00177* (2013.01); *H04N 1/00143* (2013.01); *H04N 1/00167* (2013.01); *H04N 1/00188* (2013.01); *H04N 1/00342* (2013.01); *H04N 1/346* (2013.01); *H04N 1/0019* (2013.01)

(58) Field of Classification Search
CPC .......... H04N 1/00177; H04N 1/00143; H04N 1/00167; H04N 1/0018; H04N 1/00342; H04N 1/346; H04N 1/0019
See application file for complete search history.

(56) References Cited

U.S. PATENT DOCUMENTS

| 9,451,389 | B2 | 9/2016 | Beg | |
| 9,826,049 | B2 | 11/2017 | Lim et al. | |
| 2014/0046802 | A1* | 2/2014 | Hosein | G06Q 30/06 705/26.61 |
| 2016/0189287 | A1 | 6/2016 | Van Meter | |
| 2019/0215408 | A1* | 7/2019 | Repka | H04N 1/34 |

* cited by examiner

*Primary Examiner* — Nicholas Pachol
(74) *Attorney, Agent, or Firm* — Eric Karich; Karich & Associates

(57) ABSTRACT

A system for providing customized merchandise to a user at an entertainment venue via a user computer device has a machine readable tag encoding an address, and a fulfillment computer having a printer. The machine readable tag is located at the entertainment venue. A computer memory of the fulfillment computer stores executable code that enables the fulfillment computer to perform a process having the following steps: receiving a request from the user computer device generated by capturing the machine readable tag with a camera of the user computer device; uploading at least one photograph from the user computer device; collecting payment for the customized merchandise; printing the selected photograph on the selected style of the customized merchandise; and delivering the customized merchandise to the user.

1 Claim, 9 Drawing Sheets

SYSTEM AND METHOD FOR PROVIDING CUSTOMIZED MERCHANDISE AT ENTERTAINMENT VENUES

BACKGROUND OF THE INVENTION

Field of the Invention

This invention relates generally to systems and methods for providing customized merchandise at entertainment venues.

Description of Related Art

Computer devices such as smart phones, tablets, and other similar devices typically include cameras which may be used to capture machine readable code (e.g., QR, Snapcode, NEC device, etc.), so that the computer device is directed to content (e.g., a web page, downloadable app, etc.).

The prior art teaches the use of machine readable codes, at a venue such as a sports stadium, concert hall, and other similar location-based events, for directing multimedia content to the user at the event. Examples of these teachings include the following:

Lim, U.S. Pat. No. 9,826,049, teaches a system wherein QR codes or the like are used in hardlink applications (linking a physical object or location with a web link), by which different users may receive different information in response to a user's interaction with a touchpoint. The content delivered to a particular user in response to a hardlink code or a presented hyperlink may be dependent on the time of the scan, the geographic location of the user, a weather condition at the geographical location, personal information associated with the user, a number of previous scans of the code by prior individuals, and any combination of the these or other variables, which may be determined by an originator of the QR code or other party.

Beg, U.S. Pat. No. 9,451,389, teaches a system for communicating informational content using a near field communication (NFC) device. Uniquely programmed NFC stickers can be used conjunction with NFC enabled devices, such as a smart phone, to upload a personalized multimedia greeting on a central server. Once the stickers have been distributed, a recipient can tap on the same sticker and play the greeting message using the smart phone. Retail consumers can tap on NFC tags with a smart phone to view product informational content that has been hosted on the central server by retailers and manufactures.

These references are hereby incorporated by reference in full.

SUMMARY OF THE INVENTION

The present invention teaches certain benefits in construction and use which give rise to the objectives described below.

The present invention provides a system for providing customized merchandise to a user at an entertainment venue via a user computer device has a machine readable tag encoding an address, and a fulfillment computer having a printer. The machine readable tag is located at the entertainment venue. A computer memory of the fulfillment computer stores executable code that enables the fulfillment computer to perform a process having the following steps: receiving a request from the user computer device generated by capturing the machine readable tag with a camera of the user computer device; uploading at least one photograph from the user computer device; collecting payment for the customized merchandise; printing the selected photograph on the selected style of the customized merchandise; and delivering the customized merchandise to the user.

A primary objective of the present invention is to provide a system having advantages not taught by the prior art.

Another objective is to provide a system at an entertainment venue for printing customized merchandise related to the venue.

A further objective is to provide a system that includes a machine readable code that may be scanned to enable a user to customize and purchase the merchandise, preferably with photographs provided by the user, such as photographs of the user and/or friends at the venue.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a system for providing customized merchandise at entertainment venues.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

Figure 1:
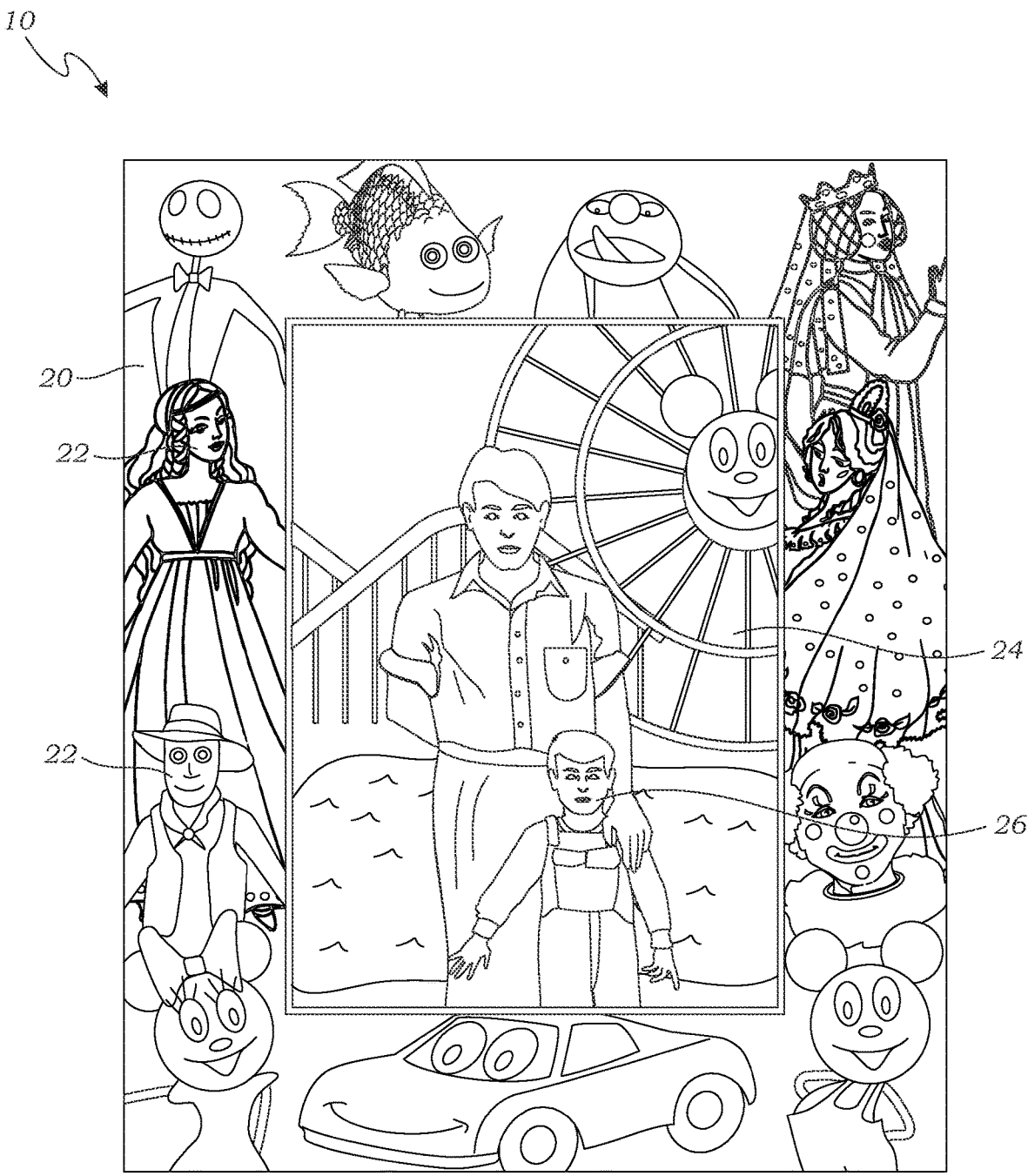
FIG. 1 is a perspective view of customized merchandise, in this case a customized blanket, that was produced using a system for providing customized merchandise at entertainment venues.

FIG. 1 is a perspective view of customized merchandise 10, in this case a customized blanket, that was produced using a system 80 (shown in FIG. 9) for providing customized merchandise 10 at entertainment venues using a custom order program 71 (shown in FIG. 9), which are discussed in greater detail below. The entertainment venues may be any form of amusement parts (e.g., Disneyland, Knotts Berry Farm, etc.), stadiums, arenas, fields, competition areas, performance halls, zoos, and any other suitable locations where attendees may wish to commemorate with customized merchandise.

As shown in FIG. 1, in this embodiment, the blanket 10 depicts stock images 22 related to the entertainment venue in a border 20 around a custom photo area 24, wherein a custom photograph 26 is selected by a user and printed on the custom photo area 24. The border 20 may be selected from one of a plurality of styles 38 (shown in FIG. 2, and discussed below) that are related to the entertainment venue.

In various embodiments, the stock images 22 may include a variety of different themes, logos, characters, people, and other images related to the venue, or be from different media properties other than Disney as shown, e.g., other film/television conglomerates, or brands related to sports, music, city programs, etc., or any other properties. Additionally, the plurality of styles 38 may include designs other than the border(s) 20, e.g., a half-frame, a transparent overlay or filter, a watermark/lettering, etc., or other customizable design. In some embodiments, the user may be able to select multiple photographs to be printed on the customized merchandise 10 (not shown).

While FIG. 1 illustrates one example of the customized merchandise 10 being in the form of a blanket, in other embodiments, the customized merchandise 10 may be any suitable merchandise, e.g., shirt or other clothing, hat, mug, ball, etc., or any other items or paraphernalia that may include the photograph 26 printed thereupon. The plurality of styles 38 may be adapted to any desired styles that are aesthetically pleasing for each specific form of merchandise and its shape.

Figure 2:
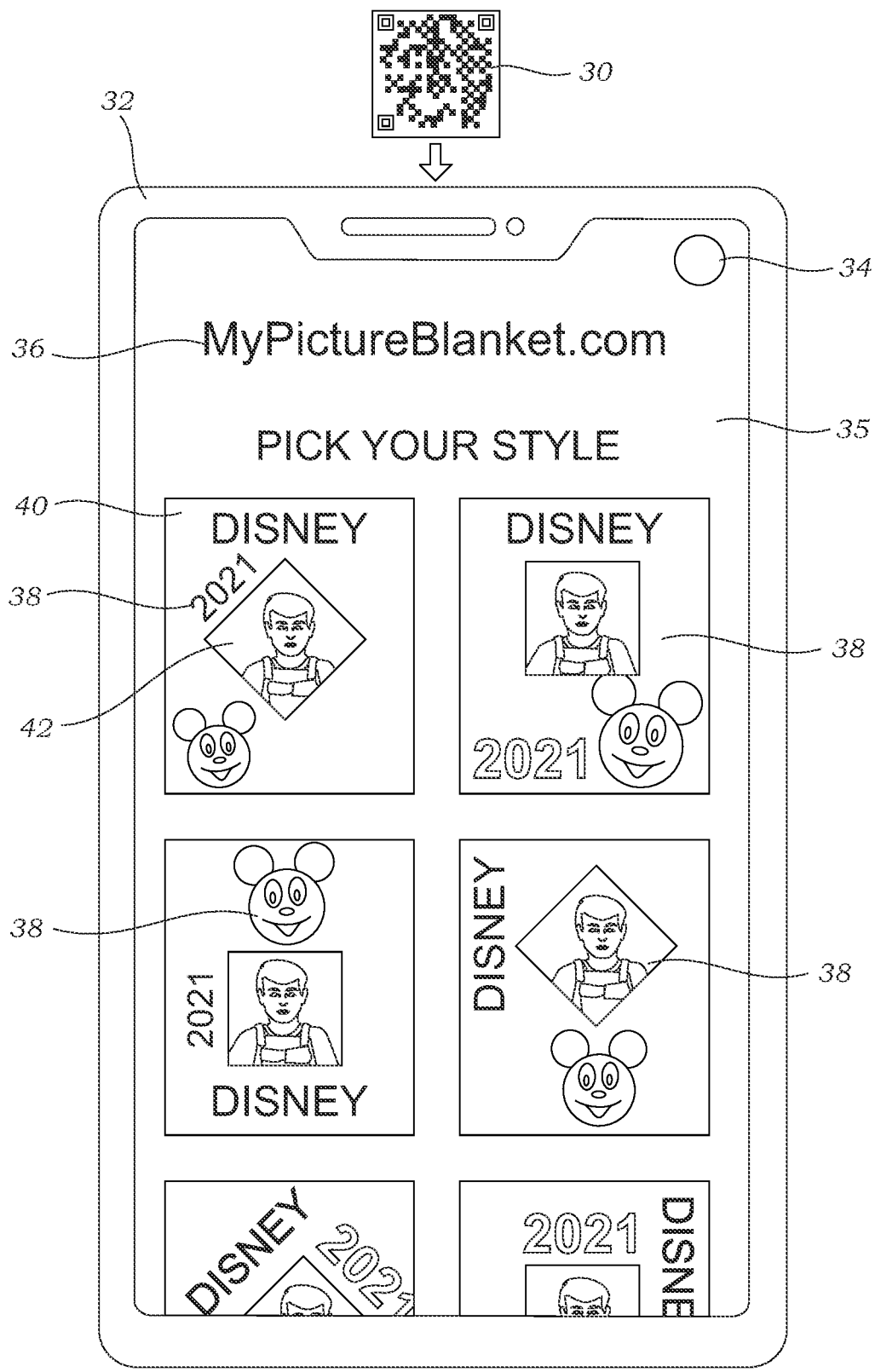
FIG. 2 is a front elevational view of a computer device being used to scan a QR code at the entertainment venue to download a first page that enables a user to select one of a plurality of styles related to the entertainment venue, for creation of the blanket.

FIG. 2 is a front elevational view of a computer device 32 being used to scan a machine readable tag 30 (e.g., QR code, snap code, NFC chip, etc.) at the entertainment venue, the computer device 32 having a camera 34. The user device 32 may typically be a mobile "smart" phone, although alternatively any form of laptop computer, tablet computer, personal digital assistant (PDA), netbook computer, and the like. The machine readable tag 30 is captured with the camera 34 to download a first page 35 that enables a user to select one of the plurality of styles 38 related to the entertainment venue, for creation of the blanket 10.

The machine readable tag 30 may be provided at a suitable location (or locations) at the venue, printed on posters at the venue, shown on display screens, printed on brochures, placed on structures at the venue, etc., for attendees of the venue to capture with the user computer device 32. In other embodiments, a tag, attached or not attached, to a lanyard, bracelet, or similar, would be handed out to every attendee of a park/concert/stadium/etc.

For purposes of this application, the term "machine readable tags" should be broadly construed to include any form of bar code, quick response (QR) code, Snapcode, near field communication (NFC) code tag, radio frequency identification (RFID) code tag, or any other equivalent device or technology known in the art, or later developed. It may be in the form of a separate piece of material (e.g., metal, plastic, etc.) that is installed in the venue, or it may be printed or otherwise provided within the venue (e.g., printed on or integrally formed with paraphernalia, or other surfaces or structures of the venue). Embodiments of the invention, provide individuals an ability to establish radio communication between their communication devices and the plurality of machine readable tags 30 by touching them together or bringing them into close proximity, usually no more than a few centimeters.

When scanned, the machine readable tag 30 directs the user device 32 to an address 36 (application, URL, etc.). As shown in FIG. 2, after scanning the machine readable tag 30, the user device 32 then arrives at the address 36, which provides the user computer device 32 with at least one page 37 that enables the user to select one of the plurality of styles 38 of the customized merchandise 10 that are related to the entertainment venue. The plurality of styles 38 may each include a preset stock area 40 and at least one custom photo area 42 for the user to select. However, in other embodiments, at least some of the plurality of styles 38 may include only the custom photo area(s) 42, without the stock area 40.

In this embodiment, the first page 35 is generated by the custom order program 71. Obviously, in some embodiments, the page displayed via the address 36 encoded in the machine readable tag 30 may have a different layout (i.e., rows/columns, content categories, menu options, etc.) than is shown in FIG. 2, which is only one example of a wide range of potential application or web page designs. Various features may be included, which may require additional steps for the system 80 of FIG. 9, e.g., a profile creation step, terms agreement, accessibility options, etc. which should be considered within the scope of the present invention. Since such features are well known to those skilled in the art, they are not discussed in greater detail herein.

Figure 3:
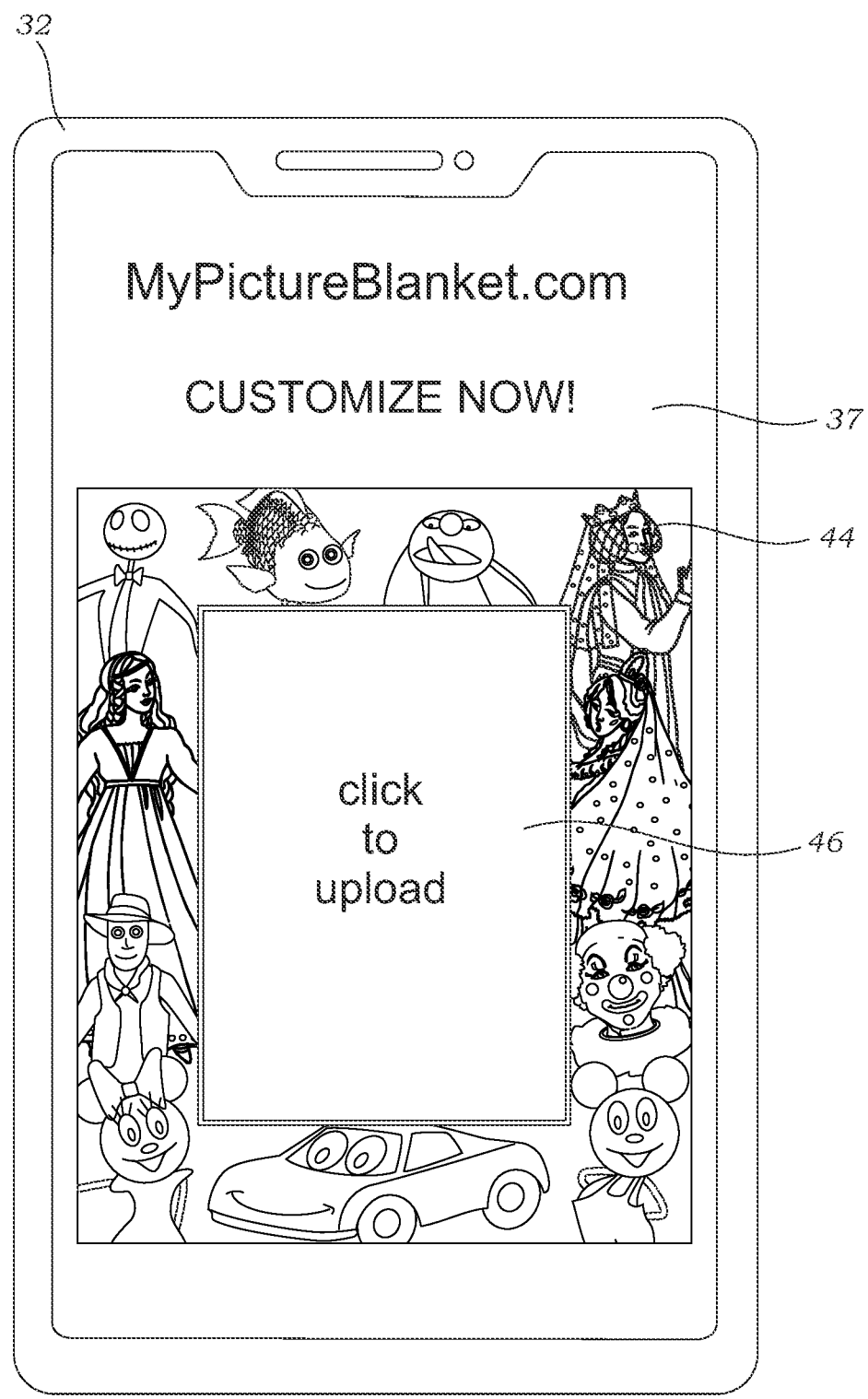
FIG. 3 is a front elevational view of the computer device being used to download a second page that enables a user to upload a photo from the computer device.

FIG. 3 is a front elevational view of the computer device 32 being used to download a second page 48 that enables the user to upload the custom photo 26 from the computer device 32. As shown in FIG. 3, after selecting one of the plurality of styles 38 (shown in FIG. 2), the computer device 32 displays a preview border 44 having an option 46 to upload a photo 26 in the custom photo area 42. In alternative applications of the present invention, the option to upload 46 may be located somewhere other than the custom photo area 42.

Figure 4:
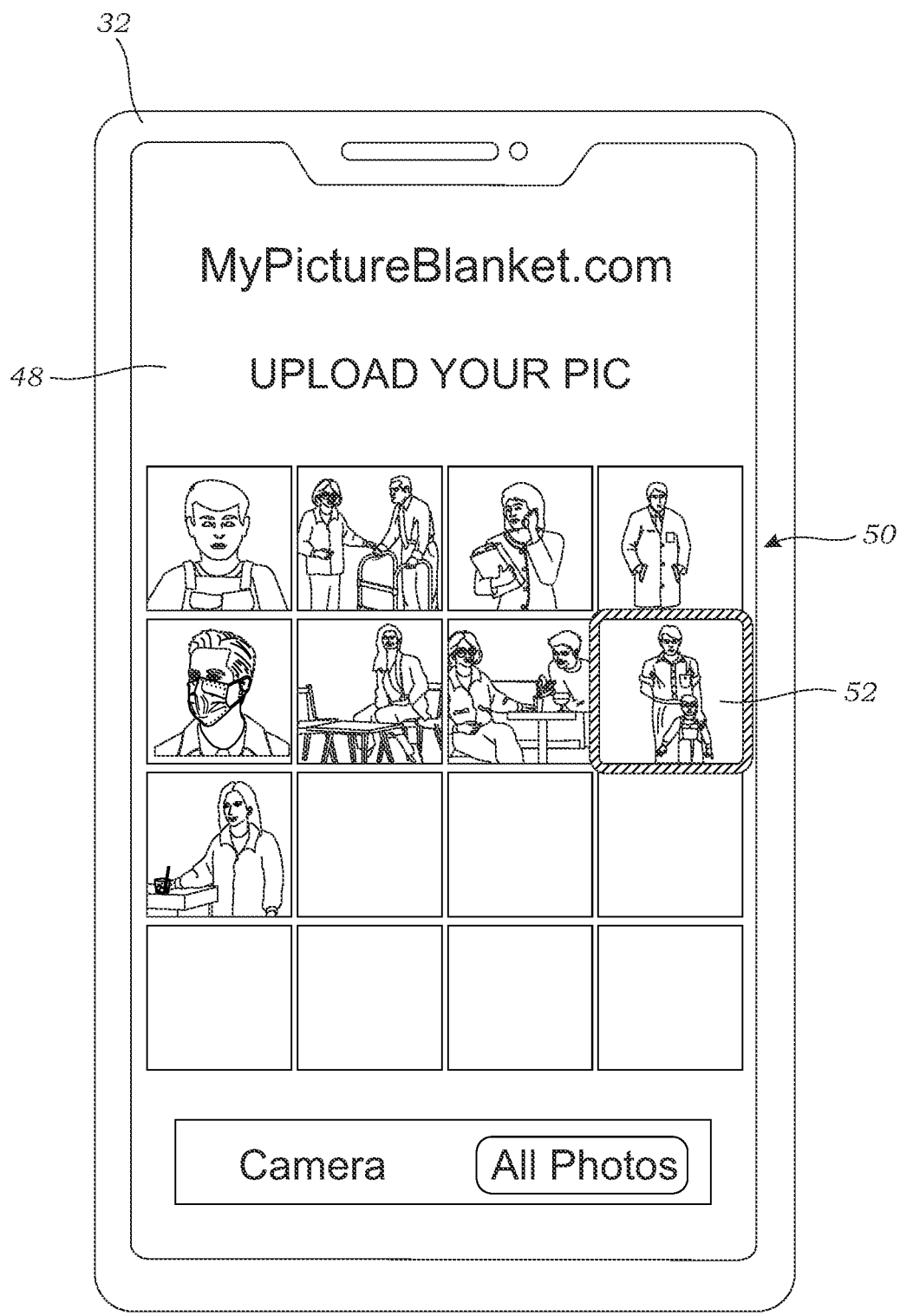
FIG. 4 is a front elevational view of the computer device being used to select one of a plurality of photos from the computer device.

FIG. 4 is a front elevational view of the computer device 32 being used to select one 52 of a plurality of photos 50 from the computer device 32. As shown in FIG. 4, the website receives permission from the computer device 32 to access the plurality of photos 50 (i.e., camera roll, downloads, drawings, etc.), wherein one or more images may be selected and uploaded.

Figure 5:
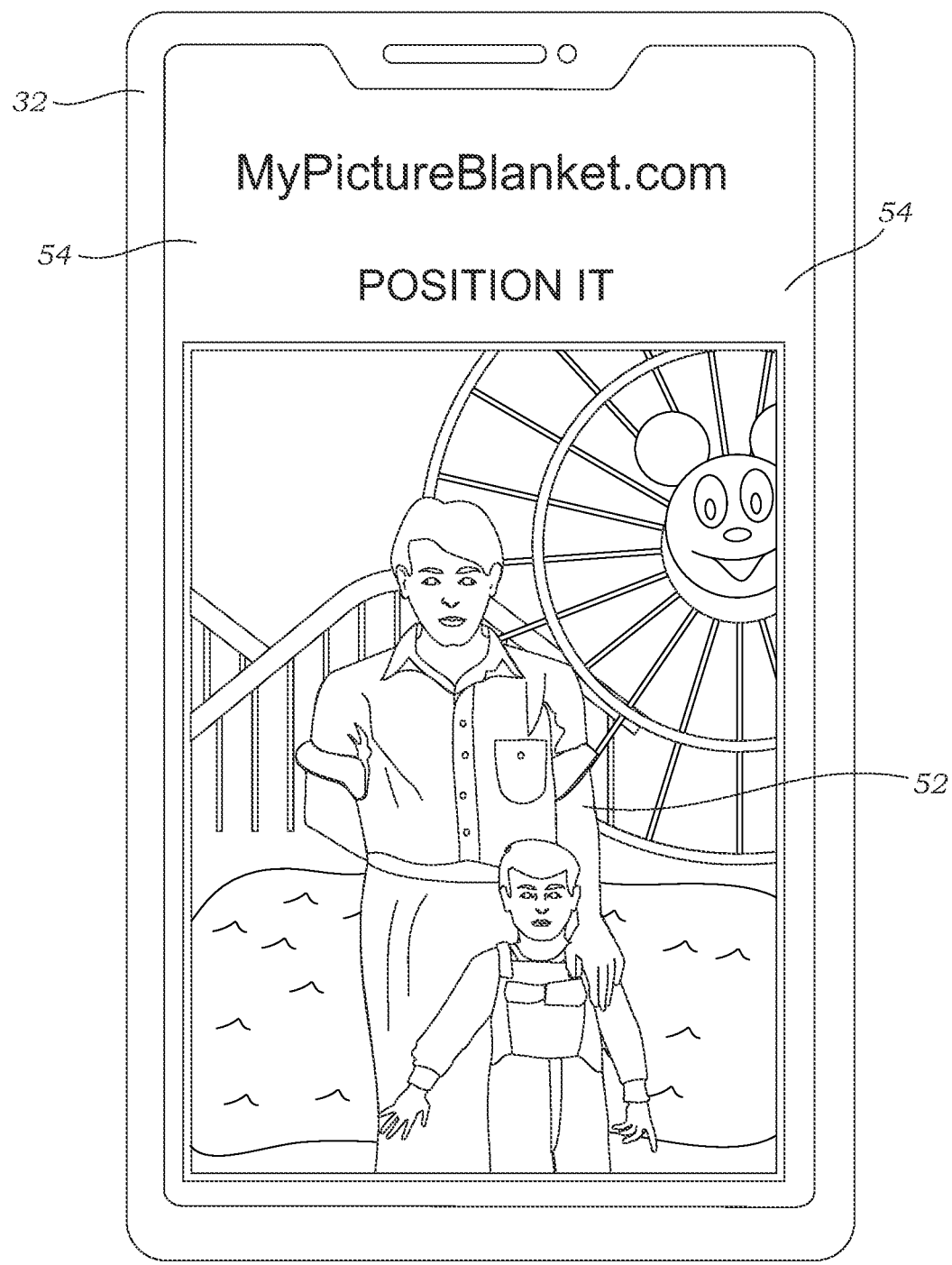
FIG. 5 is a front elevational view of the computer device being used to edit the photo that was selected, in this case by positioning the photo.

FIG. 5 is a front elevational view of the computer device 32 being used to edit the photo 52 that was selected, in this case by positioning the photo 52. As shown in FIG. 5, an editing page 54 may be shown after selecting the desired photo 52 from the plurality of photos 50 in FIG. 4. The photo 52 may be adjusted via tactile movement (i.e., standard zoom and drag for touch screens), or a toolbar may be provided (not shown). In some embodiments, options for customizing the image may be provided, e.g., a crop option, color changer, red-eye correction, a drawing option, filters, stickers etc. However, in other embodiments, the user may simply upload the photo 52 as-is from the device 32.

Figure 6:
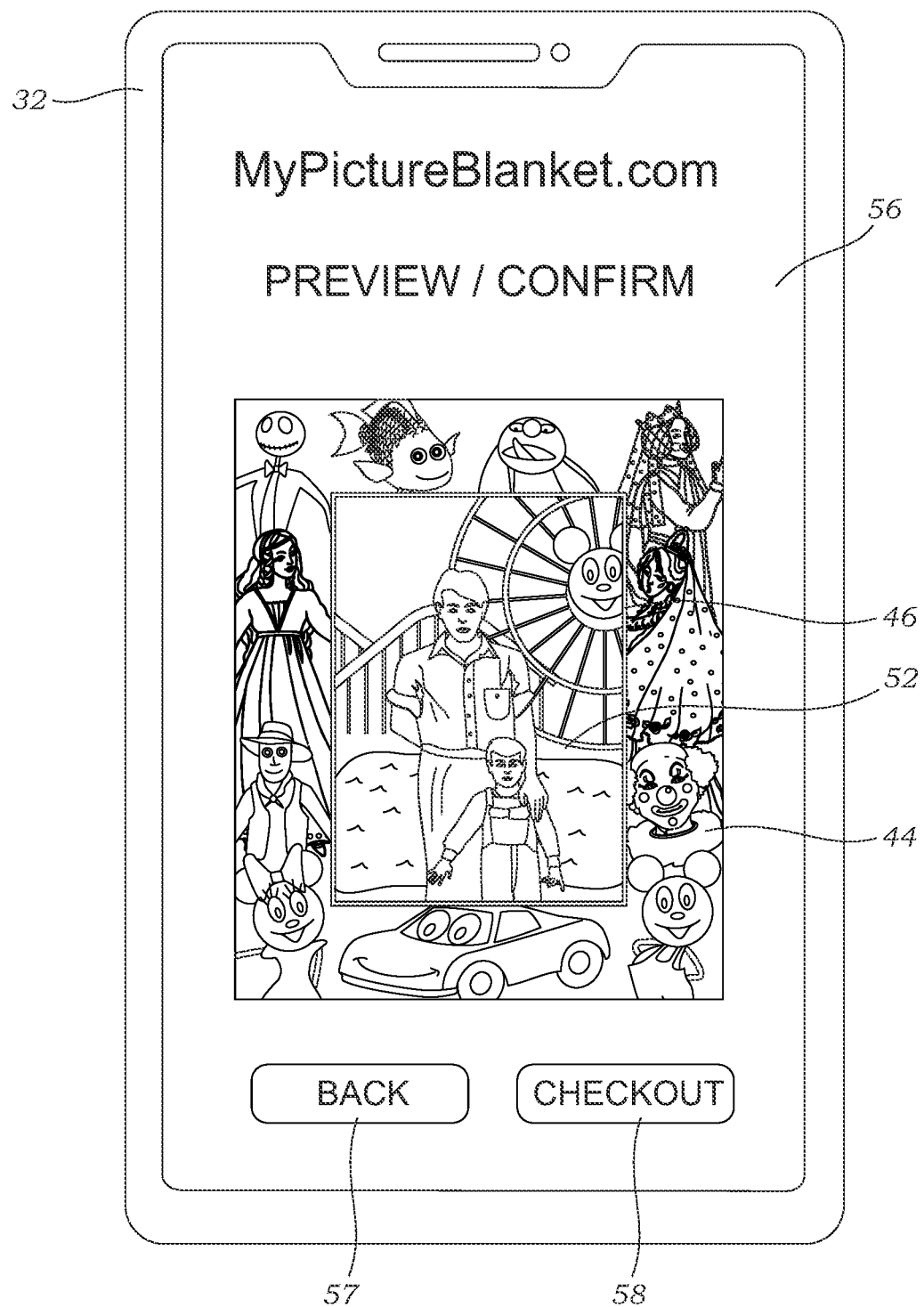
FIG. 6 is a front elevational view of the computer device illustrating a confirmation screen that enables the user to view the final product, that includes the selected style, and the photo as edited and placed within the style.

FIG. 6 is a front elevational view of the computer device 32 illustrating a confirmation screen 56 that enables the user to view the final product, that includes the selected style 38, and the photo 52 as edited and placed within the style 38. If the user wishes to make further adjustments, he or she may select a "back" option 57, or similar option such as "edit," "change," etc. If satisfied with the photo 52, the user may select a "checkout" option 58, or similar option such as "proceed," "purchase," "finish," etc.

Figure 7:
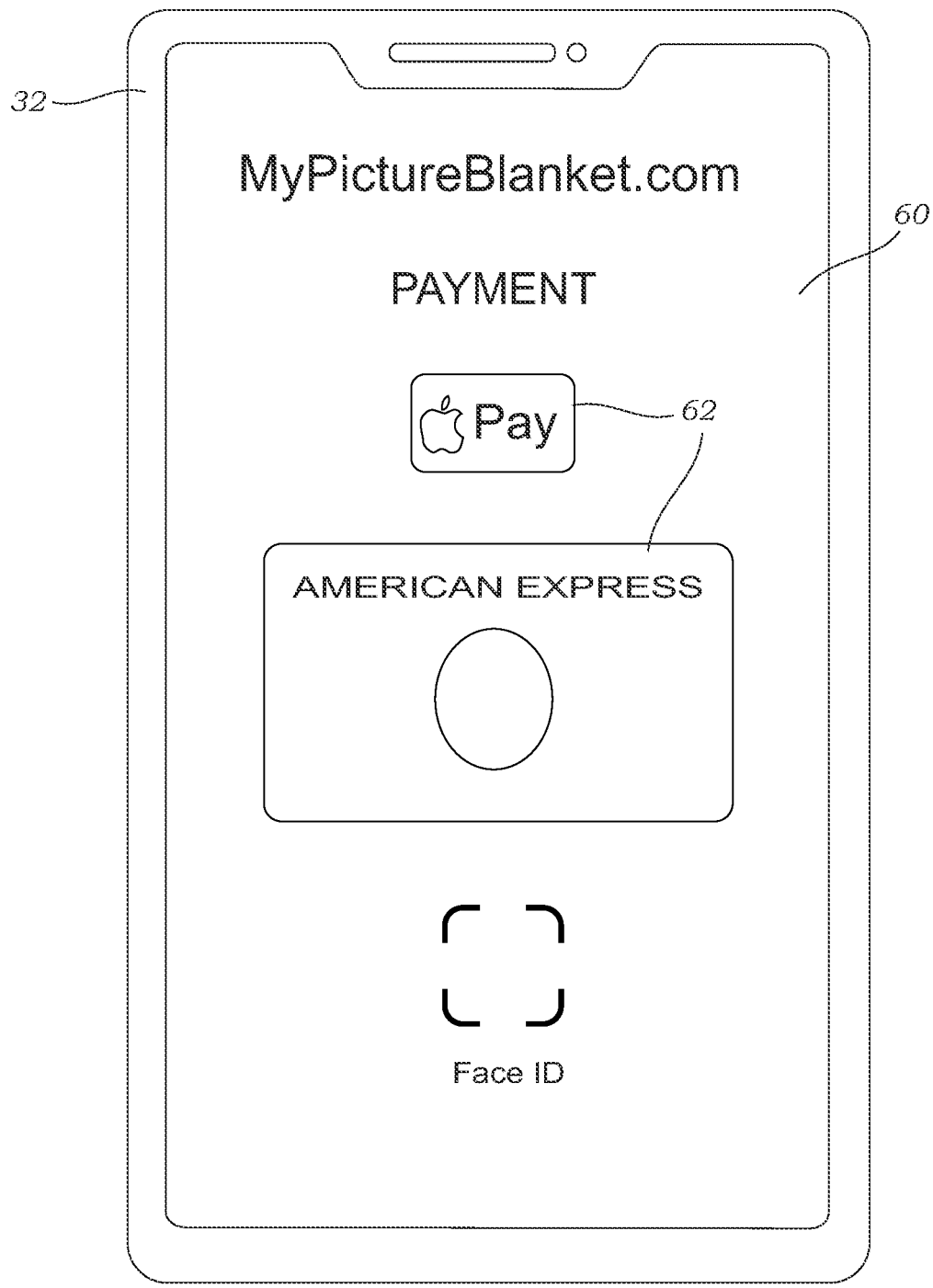
FIG. 7 is a front elevational view of the computer device illustrating a payment screen that enables the user to submit payment for the merchandise.

FIG. 7 is a front elevational view of the computer device 32 illustrating a payment screen 60 that enables the user to submit payment for the merchandise 10. As shown in FIG. 7, after selecting the "checkout" option 58 shown in FIG. 6, the user may select the preferred form of payment from payment options 62, e.g., credit card, Apple Pay/Google Pay/etc., PayPal, or any other form of payment that may be performed using the mobile device 32. Once the preferred payment option 62 is selected, the user may be prompted to input payment info/scan a code and confirm the payment.

In alternative embodiments, a different process for collecting payment may be used. For example, the use may have created an account associated with the custom order program 71, the account having a stored payment method prior to the order, wherein the process for ordering may not include the step of FIG. 7.

Figure 8:
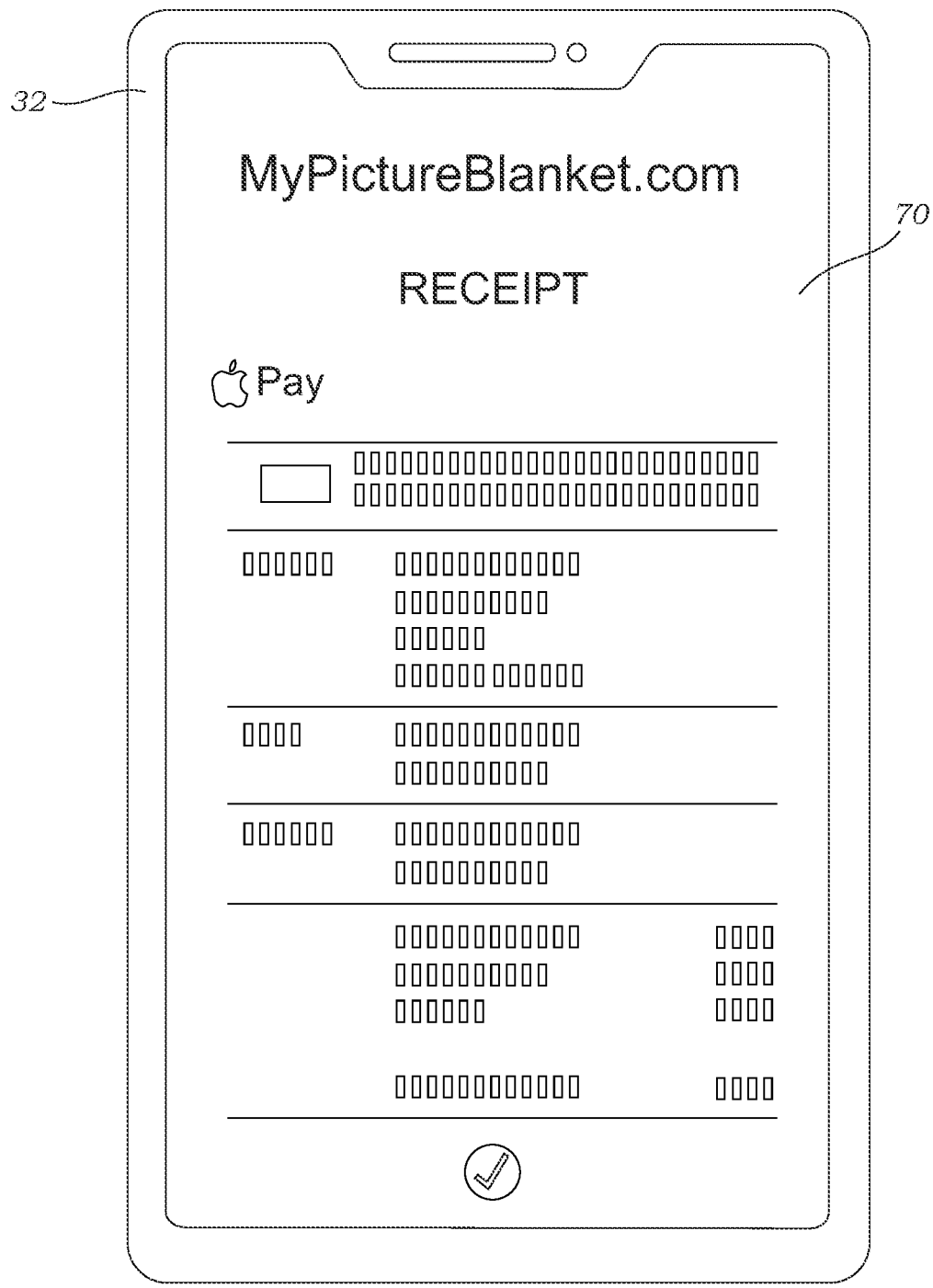
FIG. 8 is a front elevational view of the computer device illustrating a receipt screen that enables the user receive a confirmation/receipt for the merchandise.

FIG. 8 is a front elevational view of the computer device 32 illustrating a receipt screen 70 that enables the user receive a confirmation/receipt for the merchandise 10. As shown in FIG. 8, after payment has been processed, the custom order program 71 may provide payment details, and may in certain embodiments display instructions for receiving the completed customized merchandise 10 (i.e., blanket), or any other relevant details. The selected photograph 26/52 will then be printed on the selected style 38 of the customized merchandise 10. In some embodiments, only the photo area 24 is printed after the order is completed, wherein the selected style 38 is otherwise pre-printed/woven/dyed. In other embodiments, the entire design is printed onto the merchandise 10.

Figure 9:
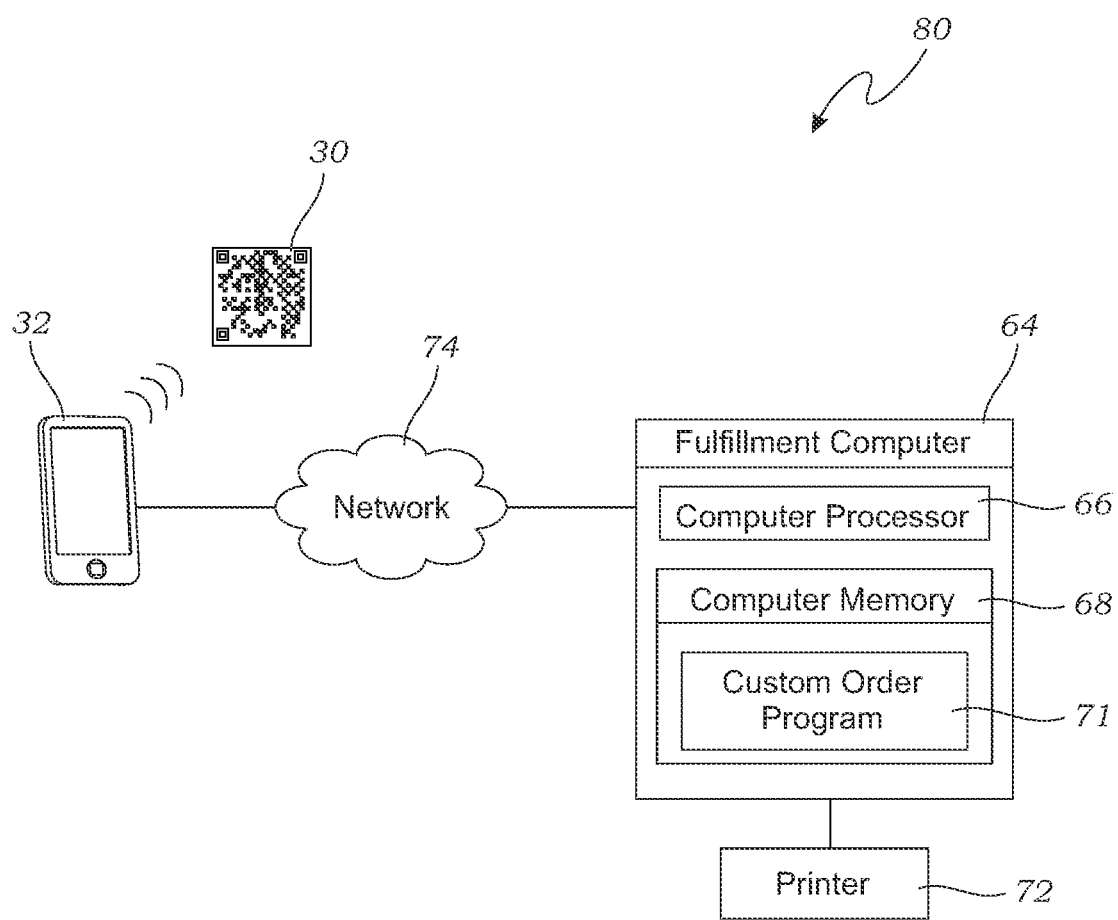
FIG. 9 is a block diagram of one embodiment of a system used for providing the customized merchandise at the entertainment venue.

FIG. 9 is a block diagram of one embodiment of the system 80 used for providing the customized merchandise 10 at the entertainment venue via the computer device 32. As discussed above, the system 80 comprises the machine readable tag 30 encoding the address 36, the machine readable tag 30 being located at the entertainment venue. As shown in FIG. 9, the system 80 further includes a fulfillment computer 64 having a computer processor 66 and a computer memory 68, and a printer 72 operably connected to the fulfillment computer 64. The printer 72 prints the photograph onto the customized merchandise 10 for delivery to the user. In one embodiment, the printer 72 is located at the venue, or in its immediate vicinity, so that the merchandise can be delivered to the user while her or she is at the venue. In one embodiment, the printer 72 may be located at the venue, for example, at an ordering/delivery booth or kiosk, so that the user can immediately take possession of the merchandise. In another embodiment, the printing may be performed nearby (e.g., within a 5 minute drive) and delivery can be made during the event (e.g., delivered to the user's seat). Various embodiments of this system may be devised according to the needs of the users, and such alternatives should be considered within the scope of the present invention.

The customer device 32 captures the machine readable tag 30 as described above, and communicates via a network 74 (e.g., the Internet) with the fulfillment computer 64. The computer memory 68 of the fulfillment computer 64 stores executable code that, when executed, enables the fulfillment computer 64 to perform a process that comprises the steps illustrated and described in FIGS. 2-8. In this embodiment, the executable code is in the form of the custom order program 71.

As shown in FIG. 9, in this embodiment the system 80 includes fulfillment computer 64. For purposes of this application, the term "computer" (or any other similar term, such as "computer device," "electronic device," "user device," etc.), refer to any form of electronic device or plurality of devices having at least one computer processor 66, e.g., a central processing unit (CPU), and some form of computer memory having a capability to store data. The computer may comprise hardware, software, and firmware for receiving, storing, and/or processing data as described below. The hardware may be in a single unit, or operably connected via the network 74. For example, a computer or server may comprise any of a wide range of digital electronic devices, including, but not limited to, a server, a desktop computer, a laptop, a smart phone, a tablet, or any form of electronic device capable of functioning as described herein.

The term "computer memory" as used herein refers to any tangible, non-transitory storage that participates in providing instructions to a processor for execution. Such a medium may take many forms, including but not limited to, non-volatile media, volatile media, and any equivalent media known in the art. Non-volatile media includes, for example, ROM, magnetic media, and optical storage media. Volatile media includes, for example, DRAM, which typically serves as main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge, or any other medium from which a computer can read. While several examples are provided above, these examples are not meant to be limiting, but illustrative of several common examples, and any similar or equivalent devices or systems may be used that are known to those skilled in the art.

The network 74 may include any device or system for communicating information from one computer device to another. For example, a global computer network (e.g., the Internet) may be used, including any form of local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, enabling messages to be sent from one to another. The network 74 may further include any form of wireless network, including cellular systems, WLAN, Wireless Router (WR) mesh, or the like. Access technologies such as 2G, 3G, 4G, 5G, and future access networks may enable wide area coverage for mobile devices. In essence, the wireless network 74 may include any wireless communication mechanism known in the art by which information may travel between computers of the present system 80.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A system for providing customized merchandise to a user at an entertainment venue via a user computer device, the system comprising:
   a machine readable tag encoding an address, the machine readable tag being located at the entertainment venue;
   a fulfillment computer having a computer processor and a computer memory;
   a printer operably connected to the fulfillment computer;
   wherein the computer memory of the fulfillment computer stores executable code that, when executed, enables the fulfillment computer to perform a process that comprises the following steps:
   receiving a request from the user computer device, the request being generated by scanning the machine readable tags with the user computer device;
   providing the user computer device with at least one page that enables the user to perform the following steps:
   i. selecting one of a plurality of styles that are related to the entertainment venue, each of the plurality of styles having at least one image that is related to the entertainment venue, and a custom photo area adjacent the image related to the entertainment venue;
   ii. selecting at least one photograph from the user computer device;
   iii. placing the selected photograph into the custom photo area of the selected style;
   iv. enabling the user to move the selected photograph within the custom photo area so that the selected photograph is properly positioned adjacent the image related to the entertainment venue;
   v. collecting payment for the customized merchandise; and
   vi. uploading the selected photograph to the fulfillment computer;
   printing the selected photograph on the selected style of the customized merchandise using the printer, positioned as designed by the user; and
   delivering the customized merchandise to the user.

* * * * *